(12) United States Patent
Nishiyashiki et al.

(10) Patent No.: US 7,903,414 B2
(45) Date of Patent: Mar. 8, 2011

(54) AIR VOLUME CONTROL MODULE FOR VEHICULAR AIR CONDITIONING APPARATUS

(75) Inventors: Yoshinori Nishiyashiki, Utsunomiya (JP); Michinori Hatada, Fujisawa (JP)

(73) Assignees: Keihin Corporation, Tokyo (JP); Fujikura Ltd., Tokyo (JP)

( * ) Notice: Subject to any disclaimer, the term of this patent is extended or adjusted under 35 U.S.C. 154(b) by 71 days.

(21) Appl. No.: 12/490,770

(22) Filed: Jun. 24, 2009

(65) Prior Publication Data

US 2009/0316363 A1    Dec. 24, 2009

(30) Foreign Application Priority Data

Jun. 24, 2008   (JP) ................................. 2008-164478

(51) Int. Cl.
*H05K 7/20* (2006.01)
(52) U.S. Cl. ............... 361/709; 361/679.46; 361/679.49; 361/679.54; 361/690; 361/697; 454/75; 454/140; 454/156; 62/160; 62/196.4; 165/42; 165/43; 165/202; 237/12.3 A; 237/12.3 B
(58) Field of Classification Search ............. 361/679.46, 361/679.47, 479.48, 679.49, 679, 54, 690–697, 361/702–712, 715–724; 165/80.2, 80.3, 165/80.4, 104.33, 104.34, 185, 42, 43, 202, 240, 241, 203; 174/16.3, 252; 62/160, 196.4, 238.6, 244, 323.1, 173; 454/75, 140, 156, 184; 237/12.3 A, 12.3 B
See application file for complete search history.

(56) References Cited

U.S. PATENT DOCUMENTS 5,531,207 A * 7/1996 Lin ................................ 123/572
5,634,348 A * 6/1997 Ikeda et al. ...................... 62/160

FOREIGN PATENT DOCUMENTS

JP      2005-289243        10/2005
JP      02005289242 A  *  10/2005

* cited by examiner

*Primary Examiner* — Michael V Datskovskiy
(74) *Attorney, Agent, or Firm* — Nelson Mullins Riley & Scarborough LLP; Anthony A. Laurentano

(57) ABSTRACT

An air volume control module for use with a vehicular air conditioning apparatus includes a circuit board including a control circuit for controlling the rotational speed of the blower of the vehicular air conditioning apparatus, a heat sink connected to the circuit board and including a fin for radiating heat generated by the circuit board, and a base housing surrounding the circuit board, the heat sink being inserted in the base housing with the fin projecting from the base housing. The base housing is mounted on the heat sink only by a locking finger. Either one of the base housing and the fin of the heat sink has a protective projection having a heightwise dimension greater than that of the locking finger.

7 Claims, 8 Drawing Sheets

AIR VOLUME CONTROL MODULE FOR VEHICULAR AIR CONDITIONING APPARATUS

BACKGROUND OF THE INVENTION

1. Field of the Invention

The present invention relates to an air volume control module for controlling the rotational speed of the blower of a vehicular air conditioning apparatus.

2. Description of the Related Art

Vehicular aid-conditioning systems include a blower unit and a cooling/heating unit. Air delivered from the blower of the blower unit is adjusted in temperature by the evaporator and heater of the cooling/heating unit and introduced as conditioned air from air outlets into the passenger compartment of the vehicle.

The blower is rotated by a motor whose rotational speed is controlled by an air volume control module for use with the vehicular air conditioning apparatus, as disclosed in Japanese Laid-Open Patent Publication No. 2005-289243.

One known air volume control module of the type described above is shown in FIGS. 7 and 8 of the accompanying drawings. As shown in FIGS. 7 and 8, the air volume control module, generally denoted by 1, comprises a circuit board 2 including a control circuit, a heat sink 3 on which the circuit board 2 is mounted, and a base housing 5 surrounding a portion 4 of the heat sink 3 on which the circuit board 2 is mounted. The portion 4 will hereinafter be referred to as "board mount 4".

The base housing 5 is generally made of a resin material and has an insertion opening 6 defined in one end thereof for the insertion therein of the heat sink 3. The heat sink 3 has a support base 7 disposed on the board mount 4 and a plurality of fins 8 mounted on the support base 7. The support base 7 is wider than the insertion opening 6. When the support base 7 is secured to the base housing 5 with the board mount 4 inserted in the insertion opening 6, the heat sink 3 is supported on the base housing 5 with the fins 8 projecting therefrom (see FIG. 8).

The board mount 4 includes a pair of parallel support plates 9, 10 (see FIG. 7) extending parallel to each other away from the support base 7. The circuit board 2 is firmly mounted on the parallel support plates 9, 10. Four terminals 11 through 14 are joined to the circuit board 2 and extend away from the board mount 4. When the board mount 4 is housed in the base housing 5, the terminals 11 through 14 project into a terminal protector 36 of the base housing 5. In FIG. 7, the terminals 12, 14 are positioned behind the respective terminals 11, 13 and hence concealed from view.

A power transistor, not shown, is mounted on the circuit board 2. The terminals 11, 12, the terminal 13, and the terminal 14 are electrically connected respectively to the drain, gate, and source electrodes of the power transistor. A capacitor 15 is also mounted on the circuit board 2.

A plurality of resistors, not shown, are also mounted on the circuit board 2. The power transistor, the capacitor 15, and the resistors are electrically connected, making up a control circuit for controlling the rotational speed of the motor.

The base housing 5 has a pair of through screw holes 16, 17 defined therein. The heat sink 3 includes a pair of internally threaded legs 18, 19 disposed adjacent to the respective parallel support plates 9, 10 and positioned diagonally opposite to each other across the heat sink 3. Screws 20, 21 are inserted respectively through the through screw holes 16, 17 and threaded respectively into the internally threaded legs 18, 19, thereby fastening the base housing 5 to the heat sink 3.

The air volume control module 1 thus constructed is installed at a given position in the vehicular air conditioning apparatus, and an electric power source is electrically connected to the terminals 11 through 14.

The base housing 5 has an end flange having a triangular end and a trapezoidal end which are opposite to each other. When an attempt is made to install the base housing 5 in a wrong orientation in the vehicular air conditioning apparatus, the triangular end of the end flange of the base housing 5 physically interferes with a certain surface of the vehicular air conditioning apparatus, preventing the base housing 5 from being installed in the vehicular air conditioning apparatus. Consequently, the base housing 5 can be installed in the vehicular air conditioning apparatus only when the base housing 5 is properly oriented with respect to the vehicular air conditioning apparatus.

The base housing 5 is fastened to the heat sink 3 by the screws 20, 21. However, the fastening process is tedious and time-consuming to perform because it is necessary to position the screws 20, 21 with respect to the through screw holes 16, 17 and turn the positioned screws 20, 21 to tighten them in the internally threaded legs 18, 19.

SUMMARY OF THE INVENTION

It is a general object of the present invention to provide an air volume control module for use with a vehicular air conditioning apparatus, which includes a base housing that can easily be installed on a heat sink.

A major object of the present invention is to provide an air volume control module for use with a vehicular air conditioning apparatus, which can be assembled according to a highly simple assembling process.

According to the present invention, there is provided an air volume control module for controlling the rotational speed of a blower of a vehicular air conditioning apparatus, comprising a circuit board including a control circuit for controlling the rotational speed of the blower, a heat sink connected to the circuit board and including a fin for radiating heat generated by the circuit board, and a base housing surrounding the circuit board, the heat sink being inserted in the base housing with the fin projecting from the base housing, wherein the base housing has an insertion opening for inserting the heat sink therethrough into the base housing, and includes a locking finger disposed adjacent to the insertion opening for locking the heat sink in the base housing, the base housing is mounted on the heat sink only by the locking finger, and either one of the base housing and the fin of the heat sink has a protective projection having a heightwise dimension greater than that of the locking finger.

In the present invention, the heat sink is mounted on the base housing by the locking finger. Thus, the heat sink and the base housing do not need to be fastened to each other by screws. In other words, it is not necessary to position screws and turn the positioned screws in securing the heat sink to the base housing. The heat sink may be installed on the base housing simply by inserting a board mount of the heat sink into the base housing.

Since no process is required to position screws and no process is required to turn the positioned screws, the air volume control module can be assembled highly efficiently according to a highly simple assembling process.

The air volume control module includes the protective projection which has a heightwise dimension greater than that of the locking finger. When the air volume control module is installed on a predetermined position of a structural member of the vehicular air conditioning apparatus, only the protective projection hits the structural member, but the locking finger does not hit the structural member. The locking finger is thus prevented from being broken by the structural member, preventing the heat sink from being dislodged from the base housing.

According to the related art, the air volume control module is prevented from being assembled in error in the vehicular air conditioning apparatus because the end surface (flange) of the base housing physically interferes with a certain portion of the vehicular air conditioning apparatus if the air volume control module is wrongly oriented. Therefore, the end flange of the base housing needs to be of a dimension which can physically interfere with the certain portion of the vehicular air conditioning apparatus. According to the present invention, the protective projection should be disposed in a position which physically interferes with the vehicular air conditioning apparatus when an attempt is made to install the air volume control module in a wrong orientation in the vehicular air conditioning apparatus.

Because of the protective projection thus positioned, an end flange of the base housing is not required to be of an excessive dimension for physical interference with a certain region of the vehicular air conditioning apparatus. As a result, the amount of a material which the base housing is made of may be reduced. The air volume control module according to the present invention is, therefore, a resource saver and a cost saver.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 7:
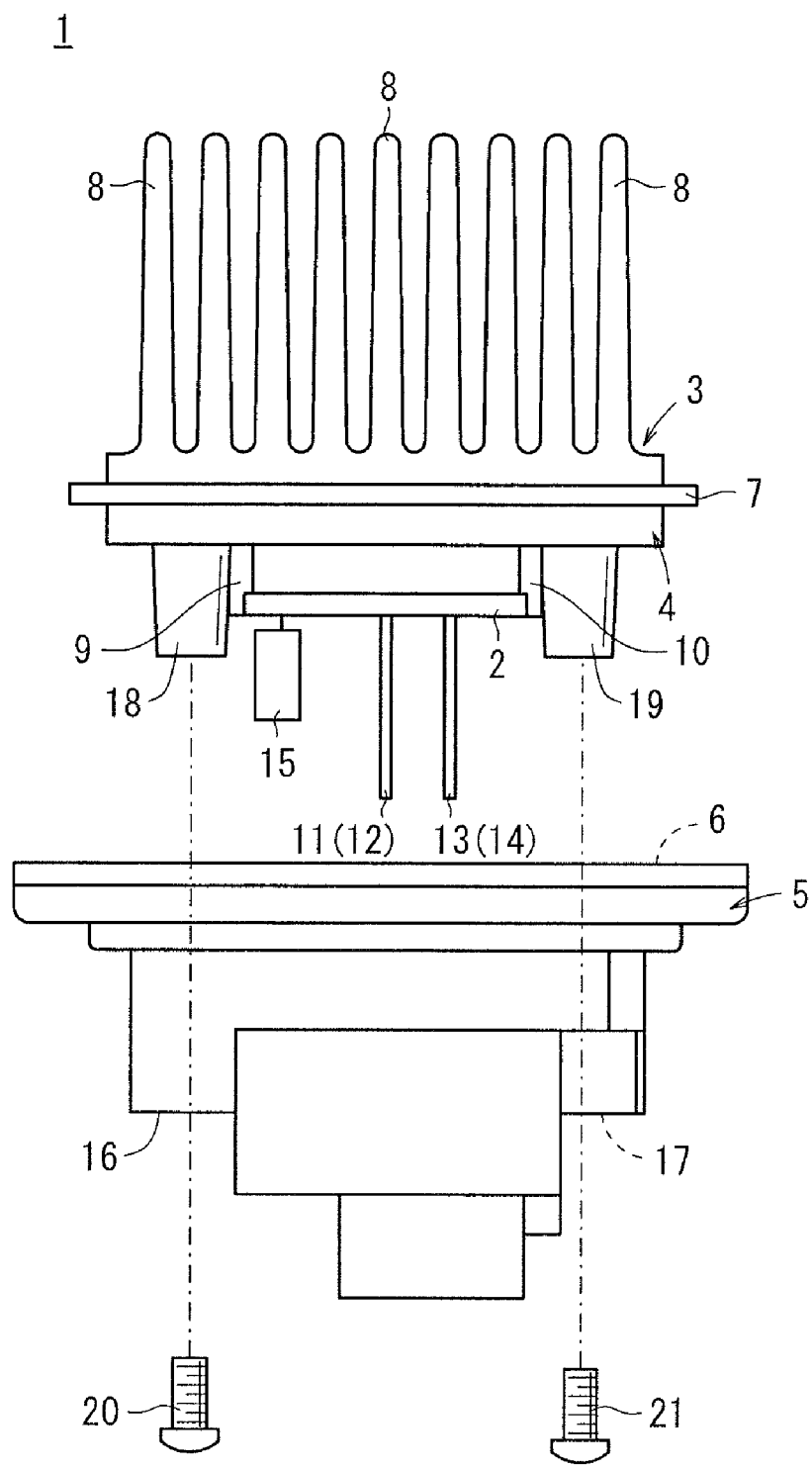
FIG. 7 is an exploded plan view of an air volume control module according to the related art.
Figure 8:
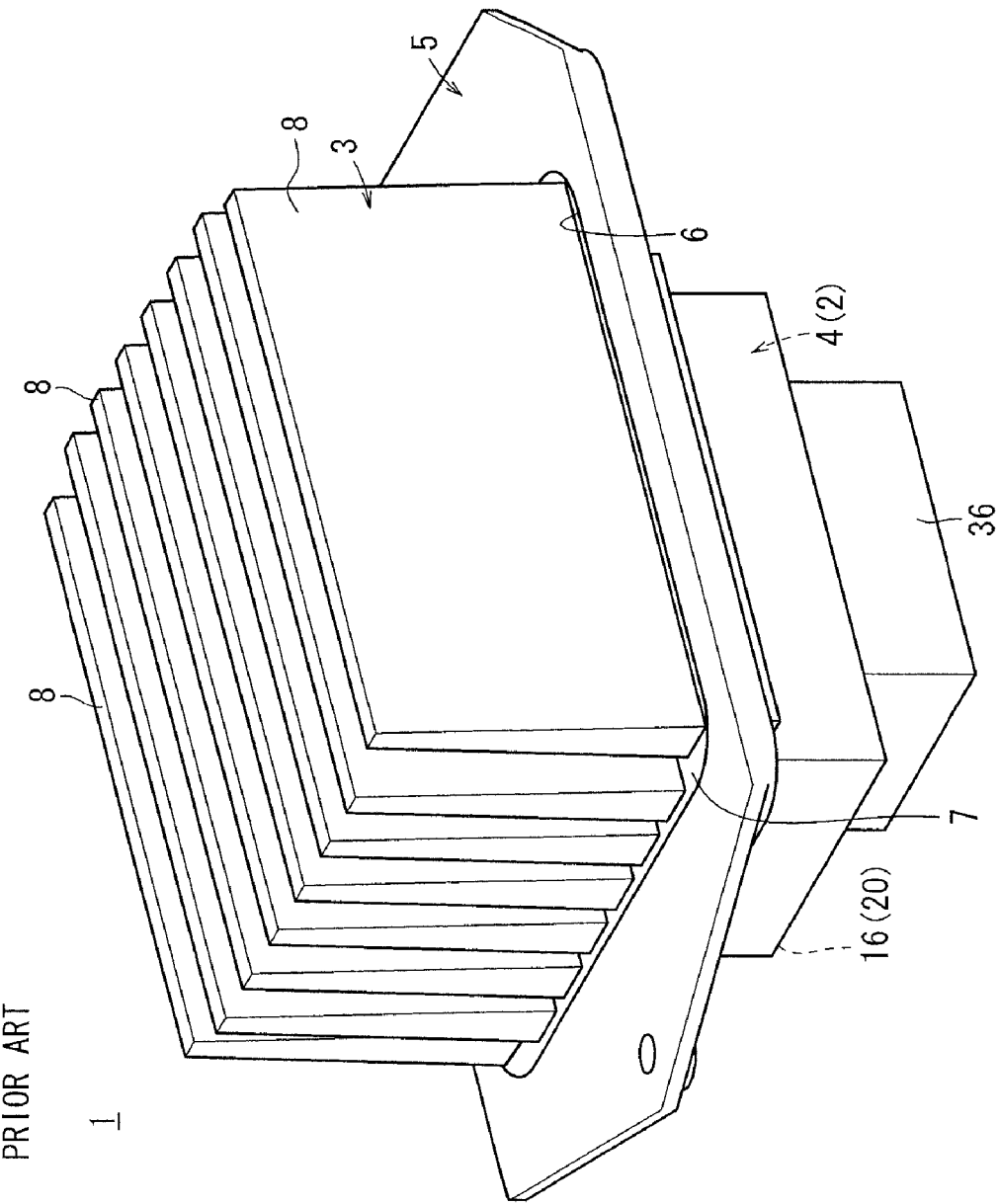
FIG. 8 is a perspective view of the air volume control module shown in FIG. 7.

Air volume control modules according to preferred embodiments of the present invention will be described in detail below with reference to FIGS. 1 through 6. Those parts shown in FIGS. 1 through 6 which are identical to those shown in FIGS. 7 and 8 are denoted by identical reference characters, and will not be described in detail below. Furthermore, like or corresponding parts are denoted by like or corresponding reference characters throughout views.

Figure 1:
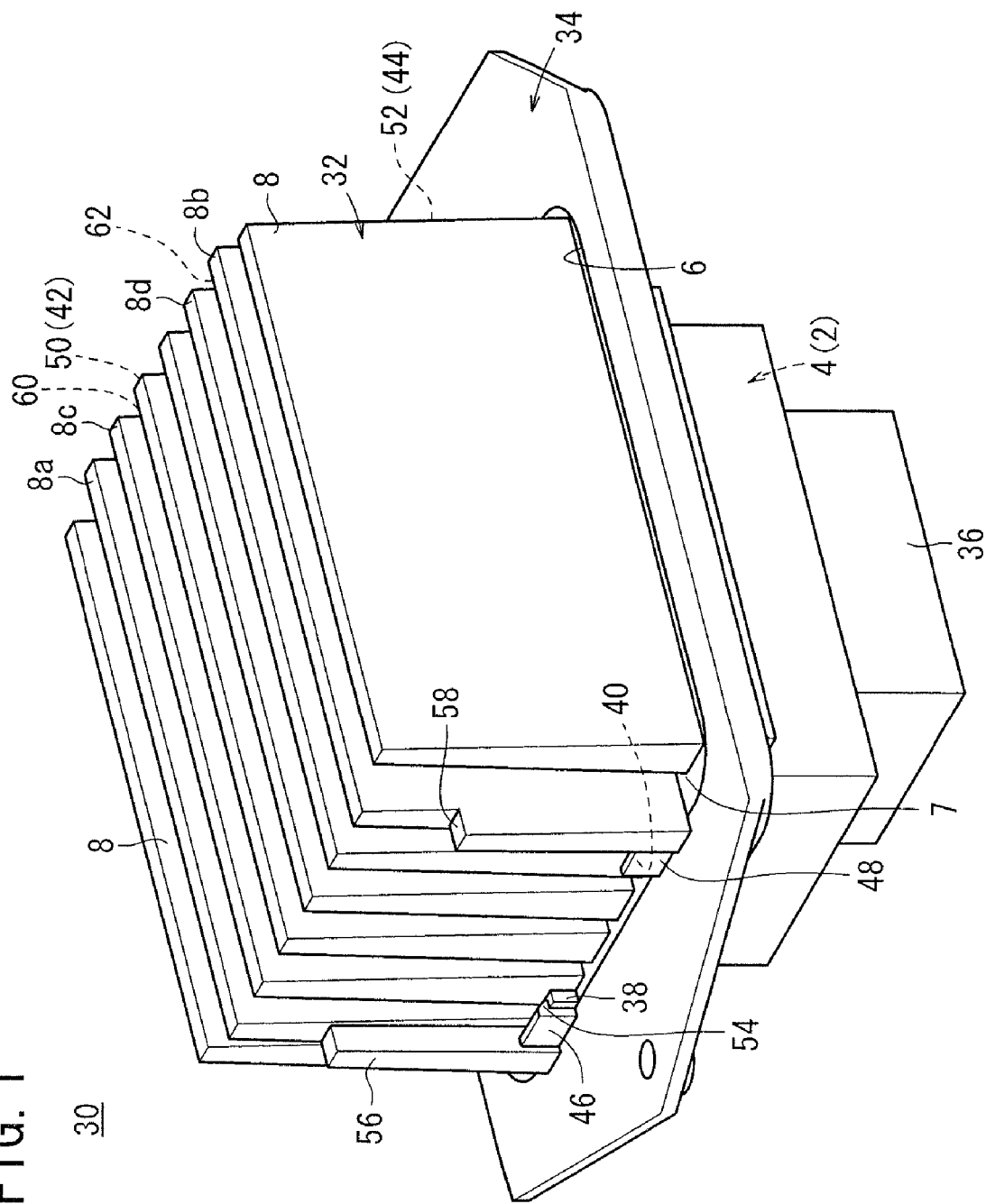
FIG. 1 is a perspective view of an air volume control module according to a first embodiment of the present invention.

FIG. 1 shows in perspective an air volume control module 30 according to a first embodiment of the present invention. As shown in FIG. 1, the air volume control module 30 generally comprises a heat sink 32 of metal and a base housing 34 connected to the heat sink 32.

The heat sink 32 is structurally similar to the heat sink 3 shown in FIGS. 7 and 8 except that the heat sink 32 is free of the internally threaded legs 18, 19. Specifically, the heat sink 32 has a wide support base 7, a board mount 4 disposed beneath the support base 7, and a plurality of fins 8 mounted on the support base 7. The board mount 4 is inserted through an insertion opening 6 defined in an end flange of the base housing 34 and finally placed in the base housing 34.

The board mount 4 includes a pair of parallel support plates 9, 10 (see FIG. 7) extending parallel to each other away from the support base 7 as with the heat sink 3. The circuit board 2 is firmly mounted on the parallel support plates 9, 10. When the board mount 4 is placed in the base housing 34, terminals that are electrically connected to the drain, gate, and source electrodes of the power transistor mounted on the circuit board 2 project into a terminal protector 36 of the base housing 34.

Figure 2:
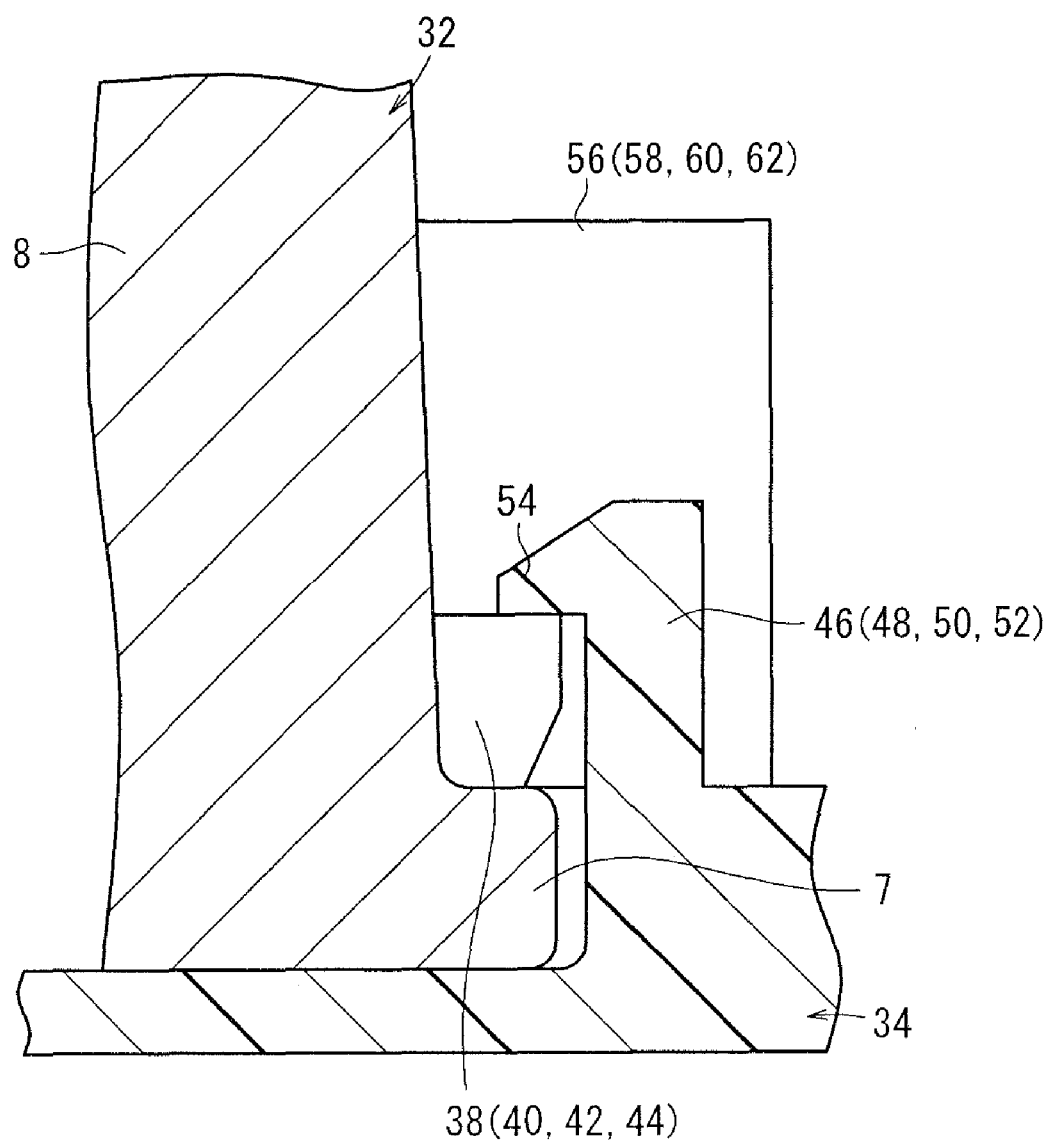
FIG. 2 is an enlarged fragmentary cross-sectional view of the air volume control module shown in FIG. 1.

The fins 8 of the heat sink 32 project from the base housing 34 (see FIG. 1). The fins 8, which are arranged parallel to each other at spaced intervals in an array, include second fins 8a, 8b and third fins 8c, 8d from respective opposite ends of the array. As shown in FIGS. 1 and 2, an engaging tooth 38 is mounted on and extends between side edges of the second and third fins 8a, 8c at their lower ends, and an engaging tooth 40 is also mounted on and extends between side edges of the second and third fins 8b, 8d at their lower ends. Similarly, an engaging tooth 42 is mounted on and extends between opposite side edges of the second and third fins 8a, 8c at their lower ends, and an engaging tooth 44 is also mounted on and extends between opposite side edges of the second and third fins 8b, 8d at their lower ends. The engaging teeth 42, 44 are positioned in line-symmetric relationship to the engaging teeth 38, 40 with respect to the axis of the array of fins 8.

The base housing 34, which is made of a resin material, has four locking fingers 46, 48, 50, 52 integrally formed therewith which project from a surface of the base housing 34 that faces away from the board mount 4. The locking fingers 46, 48, 50, 52, which are shaped identically to each other, are positioned closely to the insertion opening 6 and held in alignment with the engaging teeth 38, 40, 42, 44. The locking fingers 50, 52 are positioned in line-symmetric relationship to the locking fingers 46, 48 with respect to the axis of the array of fins 8.

As shown in FIG. 2, the locking fingers 46, 48, 50, 52 have respective hooks 54 projecting toward the fins 8 and engaging the upper end surfaces of the respective engaging teeth 38, 40, 42, 44. Since the engaging teeth 38, 40, 42, 44 of the heat sink 32 are locked by the respectively hooks 54 of the locking fingers 46, 48, 50, 52, the heat sink 32 is securely mounted on the base housing 34.

The second fin 8a includes a pair of protective projections 56, 60 on the respective longitudinal side edges thereof. The protective projections 56, 60 have a heightwise dimension greater than the locking fingers 46, 50. Similarly, the second fin 8b includes a pair of protective projections 58, 62 on the respective longitudinal side edges thereof. The protective projections 58, 62 have a heightwise dimension greater than the locking fingers 48, 52. The protective projections 56, 58, 60, 62 are positioned adjacent to the locking fingers 46, 48, 50, 52, respectively, with small clearances therebetween.

The air volume control module 30 according to the first embodiment is basically constructed as described above. A process of assembling the air volume control module 30 and advantages of the air volume control module 30 will be described below.

For assembling the air volume control module 30, the board mount 4 of the heat sink 32 is inserted into the insertion opening 6 of the base housing 34. At this time, the locking fingers 46, 48, 50, 52, which are integrally formed with the base housing 34 of resin material, are resiliently flexed away from the insertion opening 6 because the hooks 54 are pressed and laterally displaced by the respective engaging teeth 38, 40, 42, 44.

When the engaging teeth 38, 40, 42, 44 move past the respective hooks 54, the locking fingers 46, 48, 50, 52 resiliently snap back, bringing the hooks 54 into engagement with the upper end surfaces of the respective engaging teeth 38, 40, 42, 44. As a result, the engaging teeth 38, 40, 42, 44 are locked by the respective locking fingers 46, 48, 50, 52, so that the heat sink 32 is securely mounted on the base housing 34. Therefore, the heat sink 32 does not need to be fastened to the base housing 34 by screws.

According to the first embodiment, as described above, the heat sink 32 can easily be installed on the base housing 34 simply by inserting the board mount 4 of the heat sink 32 into the insertion opening 6 of the base housing 34. It is not necessary to perform a tedious and time-consuming process of positioning and tightening screws in assembling the air volume control module 30.

Figure 3:
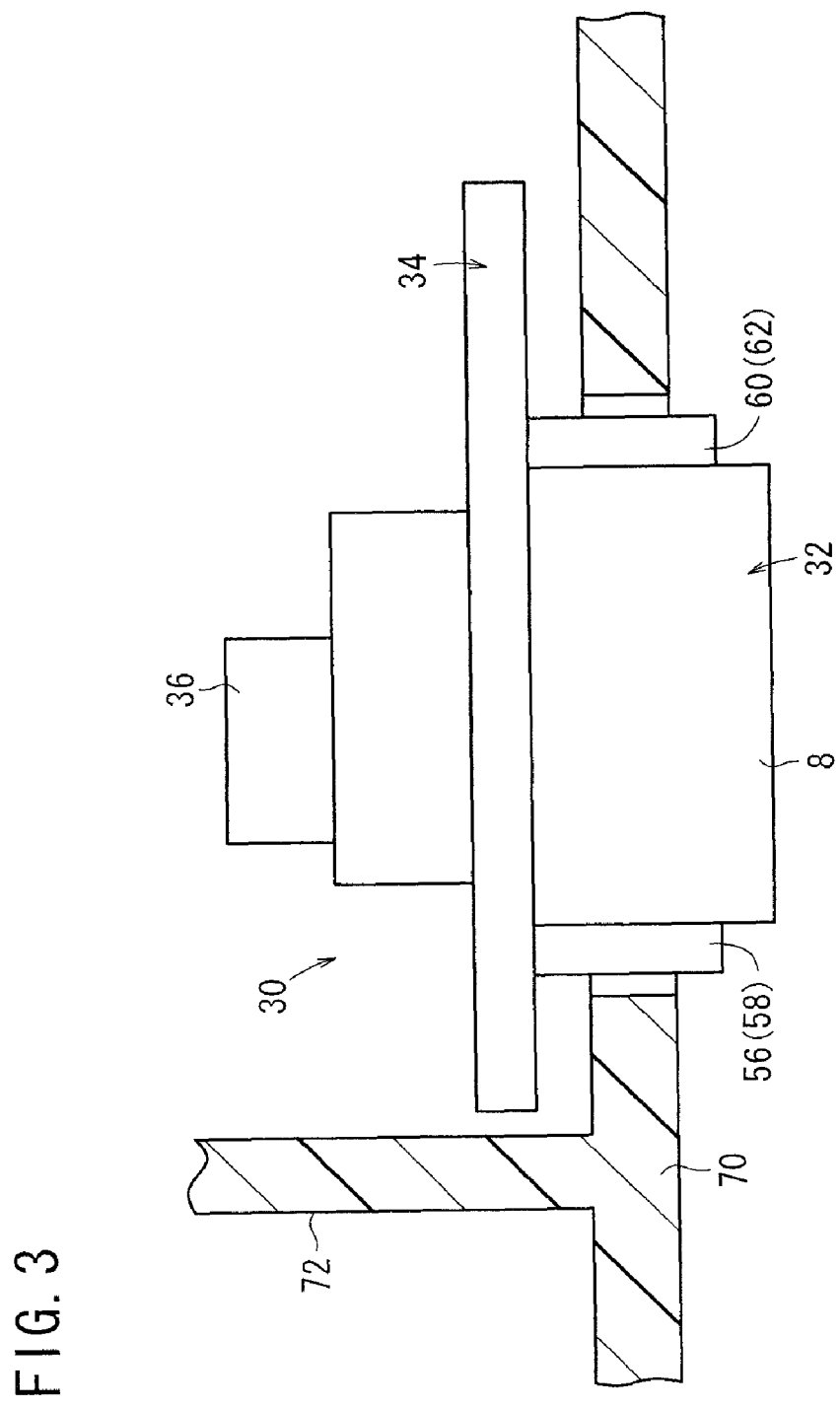
FIG. 3 is a plan view, partly in cross section, showing the manner in which the air volume control module shown in FIG. 1 is installed, with a base housing being directed in a normal orientation, on a structural member of a vehicular air conditioning apparatus.

As shown in FIG. 3, the assembled air volume control module 30 is then installed at a given position on a structural member 70 of a vehicular air conditioning apparatus, with the heat sink 32 being placed in a predetermined position in the structural member 70.

If it were not for the protective projections 56, 58, 60, 62, then the locking fingers 46, 48, 50, 52 would be fully exposed and might possibly be broken when the locking fingers 46, 48, 50, 52 hit the structural member 70 of the vehicular air conditioning apparatus.

According to the first embodiment, however, the protective projections 56, 58, 60, 62 which have a heightwise dimension greater than the locking fingers 46, 48, 50, 52 are positioned adjacent to the locking fingers 46, 48, 50, 52, respectively, as described above. Therefore, only the protective projections 56, 58, 60, 62, but not the locking fingers 46, 48, 50, 52, will hit the structural member 70 of the vehicular air conditioning apparatus. Consequently, the locking fingers 46, 48, 50, 52 are protected against being broken, preventing the heat sink 32 from being dislodged from the base housing 34.

Figure 4:
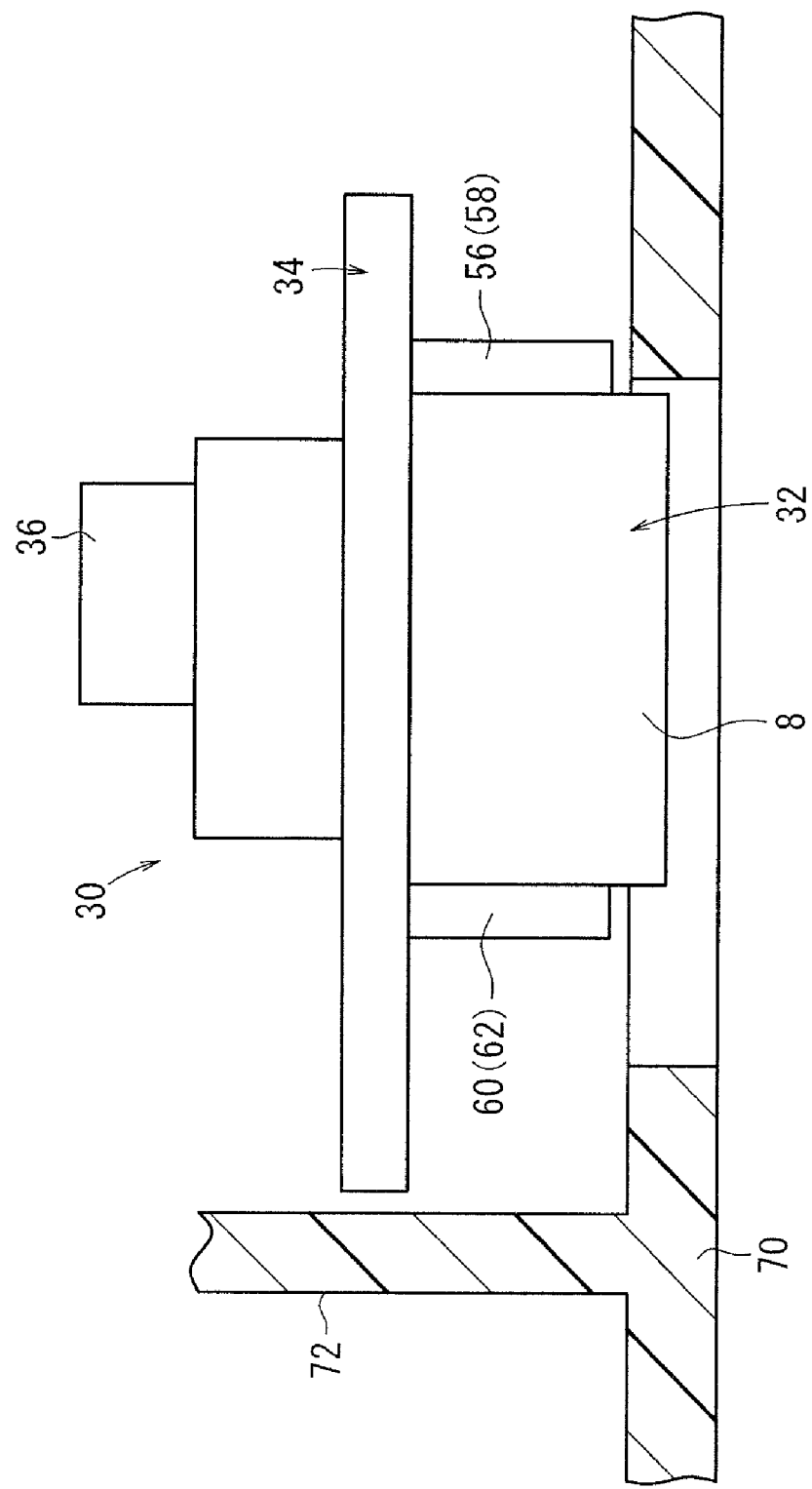
FIG. 4 is a plan view, partly in cross section, showing the manner in which an attempt is made to install the air volume control module shown in FIG. 1, with the base housing being directed in a wrong orientation, on the structural member of the vehicular air conditioning apparatus.

In FIG. 3, the air volume control module 30 is shown as being installed, with the base housing 34 being directed in a normal orientation, on the structural member 70 of the vehicular air conditioning apparatus. When an attempt is made to install the air volume control module 30, with the base housing 34 being directed in an opposite orientation, i.e., a wrong orientation, on the structural member 70 of the vehicular air conditioning apparatus, as shown in FIG. 4, some of the protective projections 56, 58, 60, 62 physically interfere with the structural member 70. Accordingly, the air volume control module 30 cannot properly be installed on the structural member 70 of the vehicular air conditioning apparatus, or stated otherwise is prevented from being assembled in error on the vehicular air conditioning apparatus.

When an attempt is made to install the air volume control module 30 which is free of the protective projections 56, 58, 60, 62, with the base housing 34 being directed in the wrong orientation, on the structural member 70 of the vehicular air conditioning apparatus, as shown in FIG. 4, some of the locking fingers 46, 48, 50, 52 would possibly hit the structural member 70 and be broken thereby. According to the first embodiment, however, since some of the protective projections 56, 58, 60, 62 physically interfere with the structural member 70, the heat sink 32 will not be further inserted into the hole in the structural member 70. The locking fingers 46, 48, 50, 52 will not be brought into hitting engagement with the structural member 70 and hence will not be broken thereby.

In addition, the end flange of the base housing 34 is not required to be of such a dimension as to extend to and interfere with a certain region of the structural member 70, e.g., a rib 72 (see FIGS. 3 and 4), when an attempt is made to install the air volume control module 30 in a wrong orientation on the structural member 70. As a result, in forming the base housing 34, the amount of the resin material which the base housing 34 is made of may be reduced. The air volume control module 30 according to the first embodiment is, therefore, a resource saver and a cost saver.

The protective projections may be integrally formed with the base housing 34. Such a modification will be described below.

Figure 5:
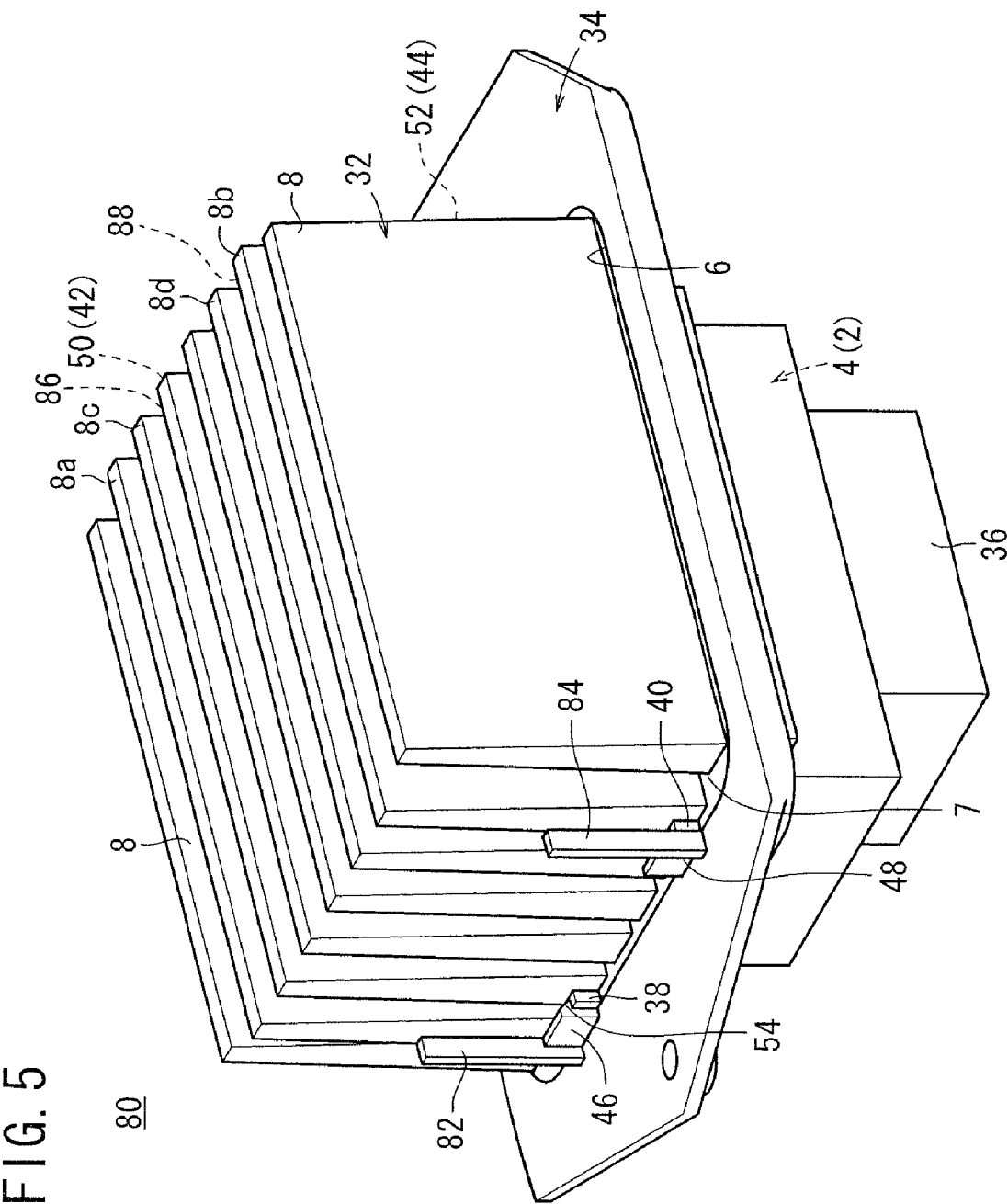
FIG. 5 is a perspective view of an air volume control module according to a second embodiment of the present invention.

FIG. 5 shows in perspective an air volume control module 80 according to a second embodiment of the present invention. The air volume control module 80 is similar to the air volume control module 30 according to the first embodiment except that the fins 8a, 8b are free of the protective projections 56, 58, 60, 62 and the base housing 34 has protective projections 82, 84, 86, 88 integrally formed therewith and disposed adjacent to the locking fingers 46, 48, 50, 52, respectively. Those parts of the air volume control module 80 which are identical to those of the air volume control module 30 according to the first embodiment are denoted by identical reference characters and will not be described in detail below.

Figure 6:
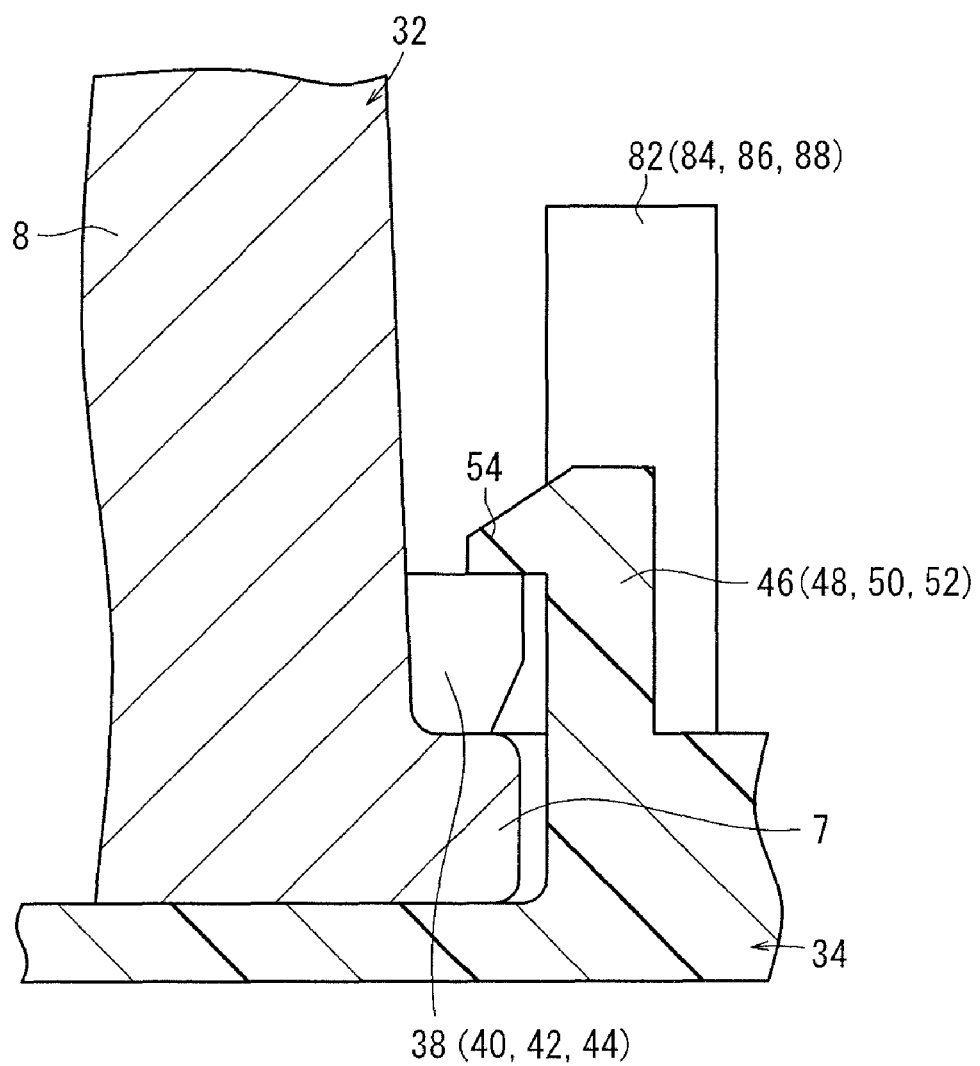
FIG. 6 is an enlarged fragmentary cross-sectional view of the air volume control module shown in FIG. 5.

As shown in FIGS. 5 and 6, the protective projections 82, 84, 86, 88 are positioned adjacent to the opposite longitudinal ends of the second fins 8a, 8b from respective opposite ends of the array of the fins 8. The protective projections 82, 84, 86, 88 are spaced from the locking fingers 46, 48, 50, 52 with small clearances therebetween to allow the locking fingers 46, 48, 50, 52 to remain resiliently flexible.

The protective projections 82, 84, 86, 88 have a heightwise dimension greater than that of the locking fingers 46, 48, 50, 52. Therefore, when the air volume control module 80 is to be installed on the structural member 70 of the vehicular air conditioning apparatus, only the protective projections 82, 84, 86, 88, but not the locking fingers 46, 48, 50, 52, will hit the structural member 70 of the vehicular air conditioning apparatus. Consequently, the locking fingers 46, 48, 50, 52 are protected against being broken, preventing the heat sink 32 from being dislodged from the base housing 34.

When an attempt is made to install the air volume control module 80, with the base housing 34 being directed in a wrong orientation, on the structural member 70 of the vehicular air conditioning apparatus, some of the protective projections 82, 84, 86, 88 physically interfere with the structural member 70, as shown in FIG. 4. Accordingly, the air volume control module 80 is prevented by the protective projections 82, 84, 86, 88 from being assembled in error on the vehicular air conditioning apparatus.

Stated otherwise, if it were not for the protective projections 82, 84, 86, 88, then when an attempt is made to install the air volume control module 80, with the base housing 34 being directed in the normal orientation but displaced from a predetermined position or with the base housing 34 being directed in a wrong orientation, on the structural member 70, some of the locking fingers 46, 48, 50, 52 would possibly hit the structural member 70 and be broken thereby. According to the second embodiment, however, since some of the protective projections 82, 84, 86, 88 physically interfere with the structural member 70, the heat sink 32 will not be further inserted into the hole in the structural member 70. The locking fingers 46, 48, 50, 52 will not be brought into hitting engagement with the structural member 70 and hence will not be broken thereby.

In the first and second embodiments, as described above, when an attempt is made to install the air volume control module 30 or the air volume control module 80 in a wrong orientation on the structural member 70, some of the protective projections 56, 58, 60, 62 or the protective projections 82, 84, 86, 88 physically interfere with the structural member 70, preventing the air volume control module 30 or the air volume control module 80 from being assembled in error on the vehicular air conditioning apparatus. However, the end flange of the base housing 34 may be of such a dimension as to extend to and interfere with a certain region of the structural member 70, e.g., the rib 72 (see FIGS. 3 and 4), when an attempt is made to install the air volume control module 30 or the air volume control module 80 in a wrong orientation on the structural member 70.

Although certain preferred embodiments of the present invention have been shown and described in detail, it should be understood that various changes and modifications may be made therein without departing from the scope of the appended claims.

What is claimed is:

1. An air volume control module for controlling the rotational speed of a blower of a vehicular air conditioning apparatus, comprising:
   a circuit board including a control circuit for controlling the rotational speed of the blower;
   a heat sink connected to the circuit board and including a fin for radiating heat generated by the circuit board; and
   a base housing surrounding the circuit board, the heat sink being inserted in the base housing with the fin projecting from the base housing;
   wherein the base housing has an insertion opening for inserting the heat sink therethrough into the base housing, and includes a locking finger disposed adjacent to the insertion opening for locking the heat sink in the base housing, the base housing is mounted on the heat sink only by the locking finger, and either one of the base housing and the fin of the heat sink has a protective projection having a heightwise dimension greater than that of the locking finger.

2. An air volume control module according to claim 1, wherein the protective projection is disposed in a position which physically interferes with the vehicular air conditioning apparatus when an attempt is made to install the air volume control module in a wrong orientation on the vehicular air conditioning apparatus.

3. An air volume control module according to claim 1, wherein the protective projection is disposed adjacent to the fin of the heat sink and projects from an end surface of the base housing, the protective projection being integrally formed with the base housing.

4. An air volume control module according to claim 3, wherein the protective projection is made of a resin material.

5. An air volume control module according to claim 1, wherein the protective projection projects from an end of the fin and is integrally formed with the fin.

6. An air volume control module according to claim 5, wherein the protective projection is made of metal.

7. An air volume control module according to claim 1, wherein the base housing includes two support plates extending parallel to each other, the circuit board being mounted on the two support plates.

* * * * *